United States Patent
Hakala

(10) Patent No.: US 10,511,035 B2
(45) Date of Patent: Dec. 17, 2019

(54) RECIRCULATION ARRANGEMENT AND METHOD FOR A HIGH TEMPERATURE CELL SYSTEM

(71) Applicant: CONVION OY, Espoo (FI)

(72) Inventor: Tuomas Hakala, Helsinki (FI)

(73) Assignee: CONVION OY, Espoo (FI)

( * ) Notice: Subject to any disclaimer, the term of this patent is extended or adjusted under 35 U.S.C. 154(b) by 0 days.

(21) Appl. No.: 15/077,230

(22) Filed: Mar. 22, 2016

(65) Prior Publication Data
US 2016/0204454 A1 Jul. 14, 2016

Related U.S. Application Data

(63) Continuation of application No. PCT/FI2013/050918, filed on Sep. 23, 2013.

(51) Int. Cl.
*H01M 8/04089* (2016.01)
*C25B 15/08* (2006.01)
(Continued)

(52) U.S. Cl.
CPC ......... *H01M 8/04097* (2013.01); *C25B 15/08* (2013.01); *F04F 5/00* (2013.01);
(Continued)

(58) Field of Classification Search
CPC ....... C25B 15/08; F04F 5/00; H01M 8/04097; H01M 8/0618; H01M 8/04201; H01M 2008/1293
See application file for complete search history.

(56) References Cited

U.S. PATENT DOCUMENTS

2005/0014047 A1 * 1/2005 Hatsugai ........... H01M 8/04089
 429/439
2008/0107932 A1 * 5/2008 Pham .................... C01B 3/38
 48/197 R
(Continued)

FOREIGN PATENT DOCUMENTS

JP A-2002-260698 9/2002
JP 2003-100334 A 4/2003
(Continued)

OTHER PUBLICATIONS

Machine translation of Japanese Patent Publication No. 2012/160361, published Aug. 23, 2012.*
(Continued)

*Primary Examiner* — Miriam Stagg
*Assistant Examiner* — Lilia Nedialkova
(74) *Attorney, Agent, or Firm* — Buchanan Ingersoll & Rooney PC

(57) ABSTRACT

A method and system for high temperature fuel cell system or electrolysis cell are disclosed which include recirculating a fraction of gas exhausted from at least one of sides an anode side and a cathode side; accomplishing a desired flow rate of the recirculated flow by using an ejector via at least one primary feedstock fluid to a nozzle of the ejector, which nozzle has a convergent-divergent flow channel through which fluid is expanded from an initial higher pressure to lower pressure; providing supplementary fluid to the nozzle of the ejector; regulating respective ratio of the fluids of the ejector to maintain a desired motive flow and pressure at the nozzle of the ejector in order to accomplish desired recirculated flow rate; and cutting off the supplementary fluid when a level of system loading is the primary feedstock fluid alone maintains desired flow and pressure at ejector inlet.

26 Claims, 7 Drawing Sheets

(51) Int. Cl.
  *F04F 5/00* (2006.01)
  *H01M 8/0612* (2016.01)
  *H01M 8/04082* (2016.01)
  *H01M 8/124* (2016.01)

(52) U.S. Cl.
  CPC ..... *H01M 8/04201* (2013.01); *H01M 8/0618* (2013.01); *H01M 2008/1293* (2013.01)

(56) References Cited

U.S. PATENT DOCUMENTS

| | | | |
|---|---|---|---|
| 2009/0155668 A1* | 6/2009 | Ban | H01M 8/04097 429/411 |
| 2011/0008692 A1* | 1/2011 | Knoop | H01M 8/04089 429/415 |
| 2013/0164641 A1 | 6/2013 | Fukuda et al. | |
| 2014/0050998 A1* | 2/2014 | Ikezoe | H01M 8/04097 429/415 |
| 2014/0212778 A1* | 7/2014 | Otsuka | H01M 8/0618 429/423 |

FOREIGN PATENT DOCUMENTS

| | | | |
|---|---|---|---|
| JP | 2003-288920 A | | 10/2003 |
| JP | 2004-199997 A | | 7/2004 |
| JP | A-2006-324187 | | 11/2006 |
| JP | A-2009-99264 | | 5/2009 |
| JP | 2012160361 A | * | 8/2012 |
| JP | A-2013-134882 | | 7/2013 |
| JP | A-2013-171782 | | 9/2013 |
| WO | WO 2012/070367 A1 | | 5/2012 |
| WO | WO 2012/105300 A1 | | 8/2012 |
| WO | WO-2013035771 A1 | * | 3/2013 .......... H01M 8/0618 |

OTHER PUBLICATIONS

Zhu, Y. et al. "Anode Gas Recirculation Behavior of a Fuel Ejector in Hybrid Solid Oxide Fuel Cell Systems: Performance Evaluation in Three Operational Modes", Journal of Power Sources, vol. 185, pp. 1122-1130, published Jul. 23, 2008.*

Ahmed, S. et al. "Start-Up of an Autothermal Reformer", ACS Division Proceedings, American Chemical Society, vol. 49, pp. 902-903, published 2004.*

International Search Report (PCT/ISA/210) dated Jun. 16, 2014, by the European Patent Office as the International Searching Authority for International Application No. PCT/FI2013/050918.

Written Opinion (PCT/ISA/237) dated Jun. 16, 2014, by the European Patent Office as the International Searching Authority for International Application No. PCT/FI2013/050918.

International Preliminary Report on Patentability (PCT/IPEA/409) dated Sep. 8, 2015 for International Application No. PCT/FI2013/050918.

Aug. 18, 2016 Office Action issued by the Korean Patent Office in Korean Application No. 2016-7010180 (English translation).

Aug. 9, 2016 Office Action issued by the Japanese Patent Office in Japanese Application No. 2016-532137 (English translation).

Dec. 6, 2016 Japanese Office Action issued by Japanese Patent Office in Japanese Application No. 2016-532137 (English translation).

* cited by examiner

RECIRCULATION ARRANGEMENT AND METHOD FOR A HIGH TEMPERATURE CELL SYSTEM

RELATED APPLICATION

This application claims priority under 35 U.S.C. § 120 to International Application PCT/FI2013/050918 which was filed on Sep. 23, 2013, designated the U.S. The content of each prior application is hereby incorporated by reference in its entirety.

FIELD

Most of the energy of the world is produced using oil, coal, natural gas or nuclear power. All these production methods have their specific issues as far as, for example, availability and friendliness to environment are concerned. As far as the environment is concerned, especially oil and coal cause pollution when they are combusted. An issue with nuclear power is, at least, storage of used fuel.

Especially because of the environmental problems, new energy sources, more environmentally friendly and, for example, having a better efficiency than the above-mentioned energy sources, have been developed. Fuel cell's, by means of which energy of fuel, for example biogas, is directly converted to electricity via a chemical reaction in an environmentally friendly process and electrolysers, in which electricity is converted to a fuel, are promising future energy conversion devices.

Especially because of the environmental problems, new energy sources, more environmentally friendly and, for example, having a better efficiency than the above-mentioned energy sources, have been developed. Fuel cell's, by means of which energy of fuel, for example biogas, is directly converted to electricity via a chemical reaction in an environmentally friendly process and electrolysers, in which electricity is converted to a fuel, are promising future energy conversion devices.

BACKGROUND INFORMATION

A fuel cell, as presented in FIG. 1, includes an anode side 100 and a cathode side 102 and an electrolyte material 104 between them. In solid oxide fuel cells (SOFCs) oxygen 106 is fed to the cathode side 102 and it is reduced to a negative oxygen ion by receiving electrons from the cathode. The negative oxygen ion goes through the electrolyte material 104 to the anode side 100 where it reacts with fuel 108 producing water and also for example carbon dioxide (CO2). Anode 100 and cathode 102 are connected through an external electric circuit 111 which includes a load 110 for the fuel cell withdrawing electrical energy alongside heat out of the system. In electrolysis operating mode (solid oxide electrolysis cells (SOEC)) the reaction is reversed, i.e. heat, as well as electrical energy from a source 110, are supplied to the cell where water and often also carbon dioxide are reduced in the anode side forming oxygen ions, which move through the electrolyte material to the cathode side where de-ionization to oxygen takes place. It is possible to use the same solid electrolyte cell in both SOFC and SOEC modes. In such a case and in the context of this description the electrodes are often named anode and cathode based on the fuel cell operating mode, whereas in purely SOEC applications the oxygen electrode may be named anode.

Solid oxide electrolyser cells operate at temperatures which allow high temperature electrolysis reaction to take place, the temperatures being for example between 500-1000° C., but even over 1000° C. temperatures may be useful. These operating temperatures are similar to those conditions of the SOFCs. The net cell reaction produces hydrogen and oxygen gases. The reactions for one mole of water are shown below, with reduction of water occurring at the anode:

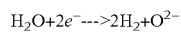  Anode:

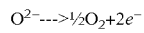  Cathode:

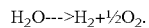  Net Reaction:

FIG. 2 shows a SOFC device as an example of a high temperature fuel cell device.

SOFC device can utilize as fuel for example hydrocarbons such as natural gas or bio gas, alcohols such as methanol or even ammonia. The SOFC device in FIG. 2 includes more than one, for example plural fuel cells in stack formation 103 (SOFC stack). Each fuel cell can include anode 100 and cathode 102 structures as presented in FIG. 1. The SOFC device in FIG. 2 also includes a fuel heat exchanger 105 and optionally also a reformer 107. For example several heat exchangers are used for controlling thermal conditions at different locations in a fuel cell process. The reformer 107 is a reactor that may be used to convert feed stocks such as for example natural gas to a composition suitable for fuel cells, for example to a composition containing hydrogen and methane, carbon dioxide, carbon monoxide and inert gases. Since the process of reforming hydrocarbon fuel involves steam, it is beneficial to recover water formed as a product of fuel oxidation in fuel cells and to use the water for fuel reforming in the reformer, thus omitting a need for an external water feed to the system once the system is already operational and generating electricity. A practical method for recovering water formed as a product of fuel oxidation reactions in the fuel cell is anode off-gas recirculation in which a fraction of the gas exhausted from anode is recirculated to be mixed with unused feed stocks through a feedback arrangement 109.

By arranging anode exhaust gas recirculation at high temperature, it is also possible to omit at least one heat exchanger. While the primary purpose of anode gas recirculation in power generating mode is to ensure favorable gas composition at reformer inlet for facilitating desired reformation reactions, it also has a benefit of increasing overall fuel utilization within the bounds of desired level of single pass reactant utilization compared to a single pass operation alone. In an electrolysis operating mode, exhaust gas recirculation may also be used for conditioning cell inlet composition for optimal electrolysis performance at desired reactant utilization rate. In both operating modes, anode gas recirculation increases overall fluid flow through stacks, improving gas flow distribution and consequently temperature and composition distribution.

During start-up of a SOFC or SOEC system, recirculation of anode gas can serve a purpose of improving distribution of heat from heat sources throughout the system or, during shut-down, means for gas circulation may assist in flush dilution of the system. In case of partial oxidation (PDX) of fuel for maintaining required oxygen-to-carbon ratio, anode gas recirculation may serve a purpose of restraining otherwise high temperature increase in PDX reactor.

Accomplishing anode gas recirculation involves recovering a fraction of anode exhaust gas flow and re-pressurising it in essence to boost its pressure enough to overcome pressure losses in the recirculation loop at a given flow. In one known embodiment of the arrangement a high pressure fuel feed is used as a motive stream in a jet-ejector to entrain anode exhaust gas and to increase pressure of the entrained gas to the level of the fuel feed-in. Due to fixed geometry of the jet-ejector, these system topologies have a limited capability for controlling the re-circulation ratio and the resultant Oxygen-to Carbon (O/C) ratio at reformer or stack inlet and therefore can include compensating means such as an external water feed and a steam generator in the system to ensure adequate but not excessive steam content at fuel cell stacks. Insufficient steam flow rate can lead to disadvantageous and potentially irreversible formation of soot in the components throughout the fuel side of the system. On the other hand, excessive recirculation and consequent fuel gas dilution, while not as catastrophic to the system as insufficient recirculation, would lower fuel cell voltages and efficiency.

Another known embodiment of the arrangement is to accomplish desired recirculation pressure boosting by a fan or a compressor. Recirculation carried out by a fan or a compressor provides added flexibility and controllability to the system operation but involves sophisticated, complex and potentially unreliable machinery. Particularly accomplishing anode gas recirculation at very high temperature, which could provide advantages of simplifying the thermal integration scheme, sets difficult design requirements and potentially adds complexity to the fan or to the compressor.

SUMMARY

A recirculation arrangement for a high temperature fuel cell system or electrolysis cell system is disclosed, each cell in the system having an anode, a cathode, and an electrolyte between the anode and the cathode, the recirculation arrangement comprising: at least one ejector for recirculating a fraction of gas exhausted from the anode side and for accomplishing a desired flow rate of the recirculated flow, the ejector having at least one nozzle; means for providing at least one primary feedstock fluid to said nozzle of the ejector, which nozzle has a convergent-divergent flow channel through which the fluid will expand from an initial higher pressure to a lower pressure; means for providing at least one supplementary fluid to said nozzle of the ejector; means for regulating a respective ratio of at least part of the fluids of the ejector to maintain a desired motive flow and pressure at the nozzle of said ejector in order to accomplish the desired recirculated flow rate; and means for cutting off the supplementary fluid when level of system loading is such that the primary feedstock fluid alone maintains the desired flow and pressure at an ejector inlet.

A recirculation method for a high temperature fuel cell system or electrolysis cell system is disclosed, the method comprising: recirculating a fraction of gas exhausted from at least one of sides an anode side and a cathode side; accomplishing a desired flow rate of the recirculated flow by using an ejector via at least one primary feedstock fluid to a nozzle of the ejector, which nozzle has a convergent-divergent flow channel through which the fluid is expanded from an initial higher pressure to a lower pressure; providing at least one supplementary fluid to said nozzle of the ejector; regulating a respective ratio of the fluids of the ejector to maintain a desired motive flow and pressure at the nozzle of said ejector in order to accomplish said desired recirculated flow rate; and cutting off the supplementary fluid when a level of system loading is such that the primary feedstock fluid alone maintains a desired flow and pressure at ejector inlet.

DETAILED DESCRIPTION

Figure 1:
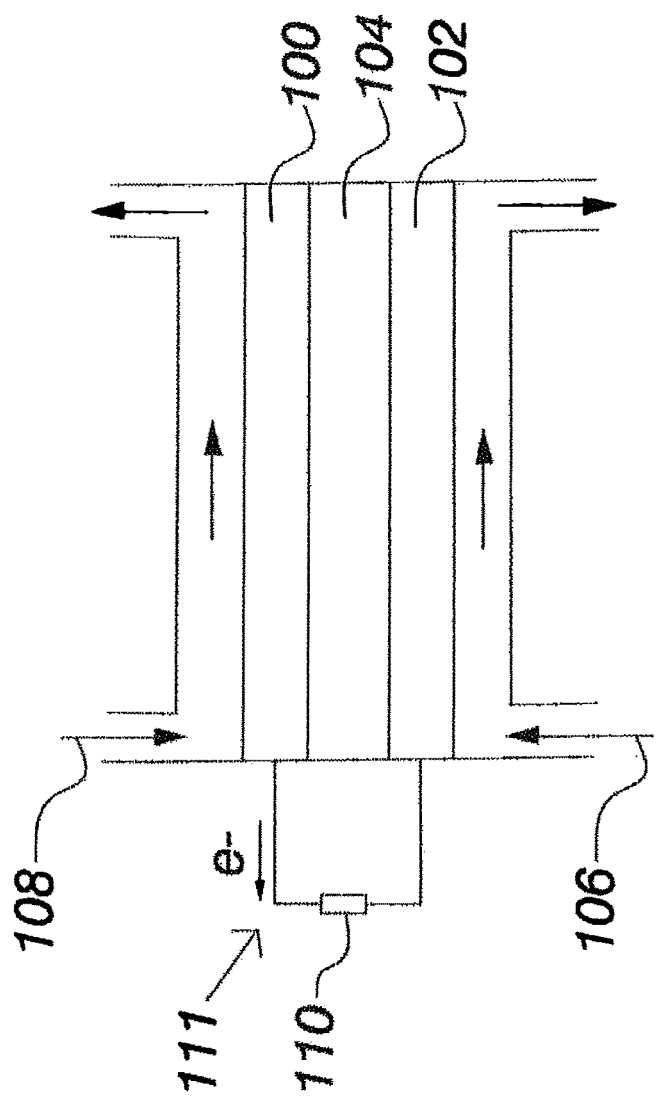
FIG. 1 presents an exemplary single fuel cell structure.
Figure 2:
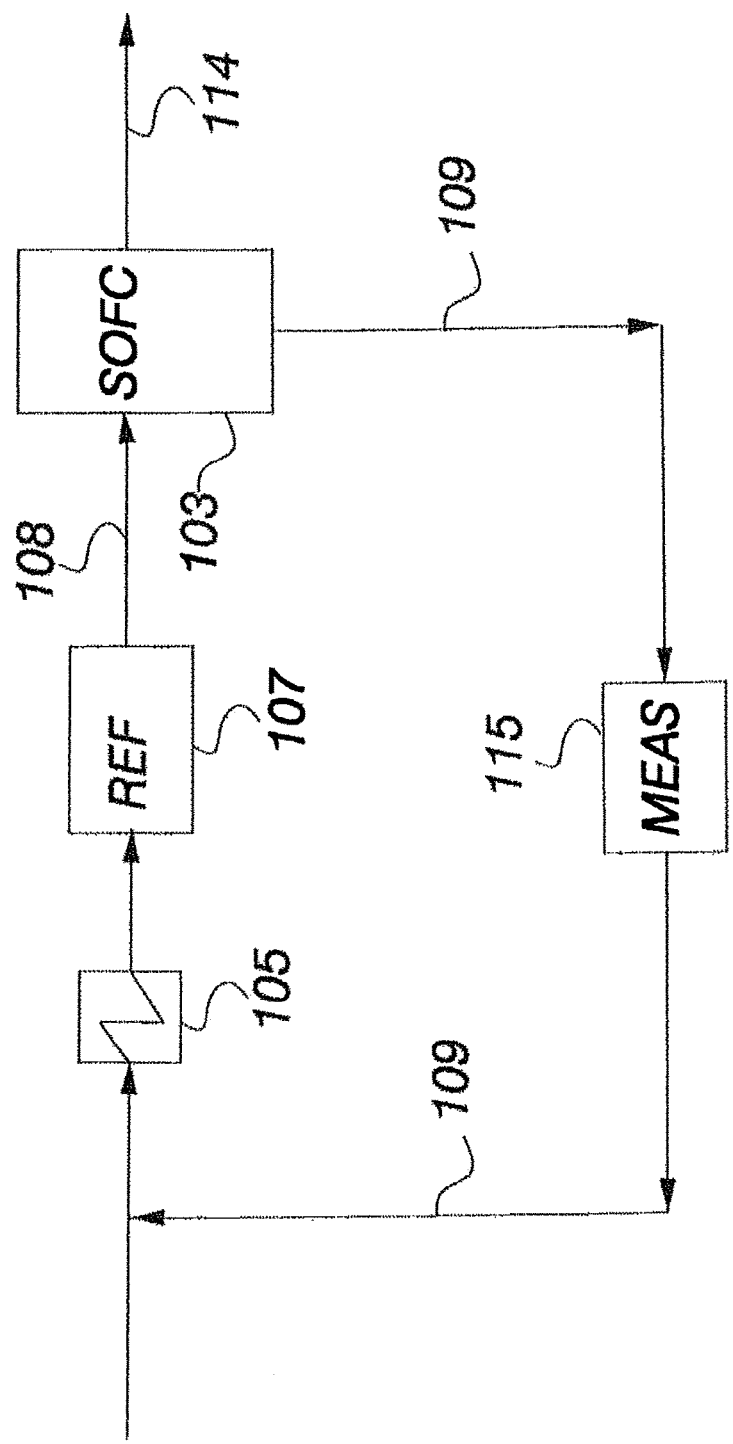
FIG. 2 presents an example of a SOFC device.

With reference to the figures, a recirculation arrangement for an SOFC or an SOEC system is disclosed which can enable effective reactant utilization in the system and thus result in a high system performance, and ensure optimized thermal and compositional conditioning in the anode side in all modes of operation, which can result in an improved feasibility and lowered complexity of a SOFC or SOEC system. This is achieved by a recirculation arrangement for a high temperature fuel cell system or electrolysis cell system, each cell in the system having an anode, a cathode, and an electrolyte between the anode and the cathode, the recirculation arrangement having at least one ejector for recirculating a fraction of gas exhausted from the anode side. The recirculation arrangement includes the ejector for accomplishing desired flow rate of the recirculated flow, the ejector having at least one nozzle, and the recirculation arrangement having means for providing at least one primary feedstock fluid to the nozzle of the ejector, and means for providing at least one supplementary fluid to the nozzle of the ejector and the recirculation arrangement includes means for regulating a respective ratio of at least part of the fluids of the ejector to maintain required motive flow and pressure at the nozzle of the ejector in order to accomplish the desired recirculated flow rate.

A recirculation method is provided for a high temperature fuel cell system or electrolysis cell system, in which is recirculated a fraction of gas exhausted from at least one of sides an anode side and a cathode side. The method can accomplish a desired flow rate of the recirculated flow by using an ejector, with at least one primary feedstock fluid to a nozzle of the ejector, with at least one supplementary fluid to said nozzle of the ejector, and a regulating of a respective ratio of the fluids of the ejector to maintain a desired motive flow and pressure at the nozzle of the ejector in order to accomplish a desired recirculated flow rate.

Exemplary embodiments are based on utilization of a recirculation arrangement by providing at least one primary feedstock fluid to a nozzle of the ejector, and by providing at least one supplementary fluid to a nozzle of the ejector, and by controlling a respective ratio of primary feedstock fluid and supplementary fluid of the ejector to maintain a desired motive flow and pressure at the nozzle of the ejector in order to accomplish a desired recirculated flow rate.

An exemplary benefit achieved by disclosed embodiments is that high system performance can be achieved together with improved feasibility and substantially low complexity of a high temperature cell system.

An arrangement as disclosed can accomplish feed stock feed and anode gas recirculation for an SOFC or an SOEC system, exploiting the inherent advantages of an ejector based recirculation topology—namely simple and reliable mechanical construction, omission of a heat exchanger and compact and cost effective anode side balance of plant sub-system—yet overcoming the known limitations and complications relating to constrained operability and controllability of ejectors—particularly unmanageability of rate of induced recirculation flow and insufficiency of motive flow and consequent motive pressure at low partial load modes of operation in relation to required recirculation flow at a given counter pressure.

Arrangements disclosed herein can include parallel, separately controlled, sufficiently pressurized and temperature controlled feed stock flows which can separately or with a supplementary feed stock fulfil the respective requirement for a motive flow passed through the ejector by which sufficient amount of anode gas suction and recirculation are induced at any given operating mode.

An ejector can have a single optimal operating point or narrow optimal operating range, outside of which their performance is impaired or at least constrained. Although ejectors with movable or adjustable parts have been made, induced flow may not be managed independent of motive flow. Additionally, such additions of complexity would likely compromise a key advantage of using an ejector at particularly high temperatures, the simplicity and reliability of a single part, solid piece of hardware. Therefore, control of recirculation flow or composition on the anode side of the system should be done elsewhere in the system, bearing in mind ejectors inherent limitations compared to an arrangement with a fan or a compressor.

Figure 3:
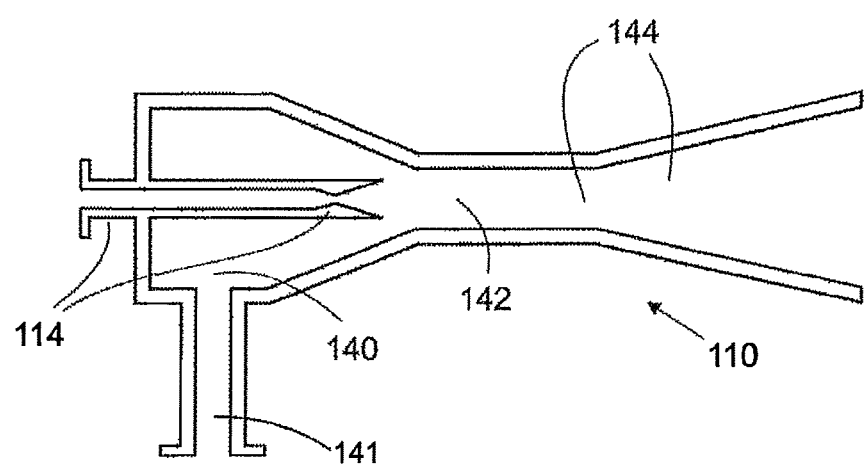
FIG. 3 presents an exemplary structure of an ejector.

FIG. 3 shows a structure of an ejector 110, which uses pressure energy of a high-pressure motive fluid stream to induce flow and boost pressure of a low pressure secondary fluid. An ejector 110 includes a nozzle 114 for motive flow, a suction port 141, a suction chamber 140, a mixing section 142 and a diffuser 144. The motive fluid is passed through the primary nozzle, which in case of a supersonic ejector has a convergent-divergent flow channel through which the flow gets expanded from its initial high pressure to a low pressure equal to that of the secondary fluid. In expansion, the motive flow is accelerated from its initial low velocity to a high velocity. The expanding jet of motive flow induces a region of low pressure to the suction chamber, entraining secondary fluid along and accelerating it by exchange of momentum with the primary flow. The motive and entrained streams mix in the mixing section. In case of a supersonic ejector, motive flow expands in a series of supersonic shocks assisting in mixing process, until the pressures of both streams become equal and flows have fully mixed. Some pressure build-up takes place in the process of mixing while further static pressure recovery takes place in the diffuser, where velocity of the mixed flow gets retarded.

Ejector performance is sensitive to counter pressure. Up to a point, increasing discharge pressure leads to diminishing entrainment capacity, after which operation becomes unstable and may switch to back-flow condition in which flow direction in suction may reverse. Since pressure losses in anode recycle loop can depend on flow restrictions in the loop and ejector counter pressure is therefore a function of recycle flow itself, back-flow condition is often not possible. However, an ejector does not inherently provide means for controlling entrainment—lowering of motive fluid flow will lower suction flow. Lowering motive flow in a fixed geometry primary nozzle will also lower motive flow pressure at the said nozzle and affect pressure boosting capability of the device. An ejector geometry has to be designed with maximum operating point in mind as volumetric flow through a critical orifice of the nozzle is passively limited to a maximum when, at the given pressure and temperature, the velocity of the fluid reaches the speed of sound (Mach=1). All other modes of operation have to be covered with resulting, non-optimized performance and possible other compensatory means.

Off-nominal modes of operation may be but are not limited to system heat-up, unloaded hot idle operation, partial load operation, system purge situation as well as situations emerging due changing composition or relative ratios of feed stocks—due to external factors or deliberate consideration.

According to an exemplary arrangement disclosed herein alternative and supplementary feed stocks can be utilized, overcoming the challenge of maintaining sufficient motive fluid flow and pressure at the primary nozzle of the ejector for achieving a required level of recirculation at different operating modes. The arrangement can include parallel sources of sufficiently high pressure feed stocks, parallel or common means for controlling temperatures of the feed stocks and connecting pipelines bringing the feed stocks together and passing them to the primary nozzle inlet of the ejector. Additionally, the arrangement can include means for by-passing desired amount of one or several feed stocks to the discharge side of the ejector. An exemplary embodiment can be arranged for heat transfer by a heat exchanger 125 (FIG. 4) between suction flow and discharge flow to decrease suction flow temperature in order to improve efficiency of the ejector 110. The heat exchanger 125 is presented in an exemplary embodiment of FIG. 4, but it can be used also in other embodiments disclosed herein.

Figure 4:
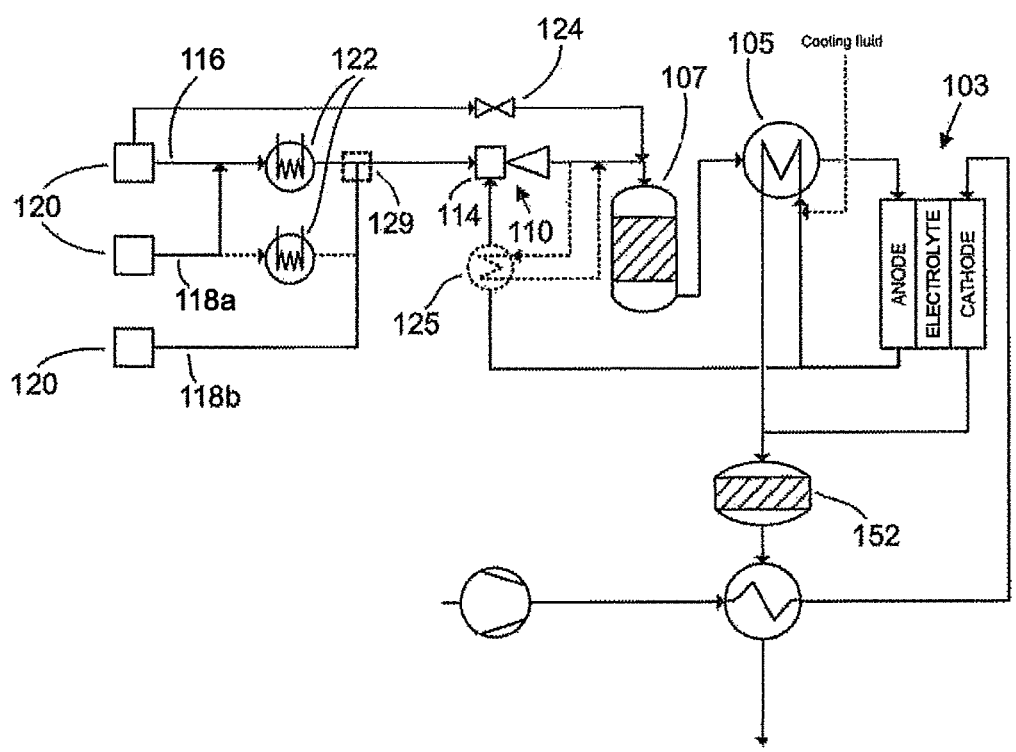
FIG. 4 presents first exemplary embodiment disclosed herein.

An exemplary embodiment as illustrated in FIG. 4 is a SOFC system of which the primary feed stock is fuel gas, a supplementary feed stock is air and alternative feed stock is inert flush gas such as nitrogen. During a system heat-up at low temperature, air may be used as a sole feedstock, flow of which can alone be sufficient for maintaining desired level of recirculation for distributing heat throughout the anode side of the system. Means (e.g. a heat exchanger) for pre-heating the feed stock can be controlled for achieving desired ratio of motive and induced flows. After an initial period of low temperature system heat-up, during a transient stage of system flush an inert gas such as nitrogen can be used as a motive fluid in the ejector 110, inducing recirculation by which flush dilution and displacement of oxygen throughout the anode side of the system may take place. As soon as pre-reformer temperature reaches a sufficient temperature, partial oxidation mode of operation may be started by introducing a mixture of air and fuel gas at a desired ratio as a motive fluid to the ejector 110.

Temperature of the mixture fluid can be controlled for adjusting the desired ratio of motive and induced flows as long as fluid temperature is maintained below reaction threshold temperature of said mixture. At this mode, oxygen-to-carbon ratio is solely determined by the feed stocks as fuel cells are not loaded and do not produce water. By inducing adequate level of recirculation, temperature increasing effect of partial oxidation can be lessened. As soon as fuel cell loading and water formation begins, ratio of air in the primary fluid mixture may be lowered while overall fuel feed is ramped up for maintaining sufficient primary flow. Once level of system loading is such that fuel feed alone maintains desired flow and pressure at ejector inlet and fuel cell reactions provide enough of water for pre-reforming, air feed for partial oxidation may be cut off entirely while further system ramp-up to the nominal fuel feed and nominal load may take place purely by increasing primary fuel feed and consequent motive pressure. The described arrangement solves a problem of maintaining recirculation in such modes of operation when fuel cell stacks do not consume fuel but only require a certain atmosphere in terms of temperature and composition, by supplementing a fraction of fuel by air as motive flows in the ejector and the two fluids forming a suitable mixture for partial oxidation as means for achieving a desired hydrogen containing composition.

Figure 5:
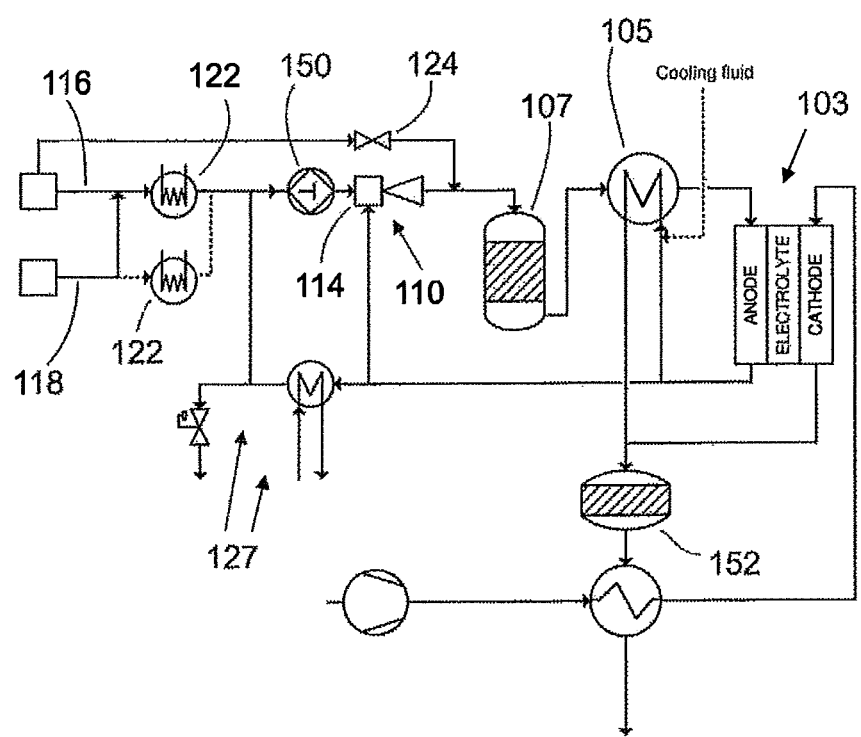
FIG. 5 presents second exemplary embodiment disclosed herein.

An alternative embodiment for arranging sufficient motive flow in the ejector 110 nozzle 114 independent of rate of fuel feed-in flow for inducing desired level of suction flow is illustrated in FIG. 5. In this embodiment a fraction of anode tail gas is recovered to be used as a supplementary feed stock in the ejector 110 primary nozzle 114. Recovery of such fluid may be arranged by means of a gas pump or compressor 150 once temperature of the fraction of fluid has been lowered to a level tolerable for the device. Temperature adjustment may be accomplished by means of a heat exchanger 127, equipped possibly with condensate separation and draining system as means for removing liquid phase from fluid flow.

In a controlled system shut-down the above described stages proceed in reverse order. The difference compared to system start-up is that fuel cell stacks and balance of plant are already at their operational temperature, and in the fuel cell system has to be arranged means for removing heat from the stacks while maintaining required inlet temperature of the PDX reactor. This can be accomplished for example by an additional cooling heat exchanger downstream of PDX reactor or for example by utilizing the existing fuel pre-heater 105 upstream of stacks 103 and injecting and mixing cooling fluid flow in hot inlet stream of the said pre-heater 105. If such cooling fluid is air, it will participate in combustion of residual fuel in an after burner 152. Such an arrangement to facilitate cooling of anode exhaust streams can during other operation modes such as start-up and nominal operation also be utilized to increase temperatures of outgoing streams by allowing combustion to take place in relation to the mixing, prior to the afterburner. Such means for boosting anode exhaust temperatures can be located at multiple locations along the anode exhaust stream e.g., in relation to heat exchangers recuperating heat to anode or reformer inlet streams, possibly part of them being configured to be capable of also providing cooling in certain operation modes.

Next is explained more in detail exemplary embodiments according to the present invention. In FIG. 4 is presented a first exemplary embodiment, in which embodiment is presented a recirculation arrangement for a high temperature cell system. The cell system can be a fuel cell system or an electrolysis cell system, and so the cell stacks can be fuel cell stacks or electrolysis cell stacks. In this description related to embodiments disclosed herein a cathode side is meant to be the side where oxygen flows, and an anode side is meant to be the side where hydrogen flows or reactants containing hydrogen flows. The recirculation arrangement includes at least one ejector 110, which can recirculate a fraction of gas exhausted from the anode 100 side and by accomplishing desired flow rate of the recirculated flow. In this exemplary arrangement the at least one ejector 110 recirculates a fraction of gas exhausted from the anode 100 side. The recirculation arrangement can include in a further embodiment (FIG. 5) means 150 for recovering and re-pressurizing a fraction of anode 100 side gas to be further used as a supplementary fluid in the ejector 110 for inducing the recirculation of anode side gas. The means 150 are for example a gas pump or a compressor together with a heat exchanger 127 capable of lowering of recovered anode tail gas temperature adequately for a gas pump or a compressor, which can re-pressurize a required flow to a pressure of ejector 110 primary flow supply.

As presented already in FIG. 3 the ejector 110 includes at least one nozzle 114. The recirculation arrangement of FIGS. 4, 5, 6 includes means 116 for providing at least one primary feedstock fluid to said nozzle 114 of the ejector 110, and means 118a, 118b, 118c, . . . for providing at least one supplementary fluid to the nozzle 114 of the ejector 110. If more than one supplementary fluid is provided as for example in the embodiments of FIGS. 4 and 6 the means 118 are presented as 118a, 118b, 118c, . . . . The means 116, 118 are for example a supply line or a storage for a gas feed stock or supply line for a liquid feed stock and means such as an evaporator for forming a gaseous fluid by evaporating the liquid as well as necessary piping connecting parallel feed stock supplies to a common feed in pipe connected to the ejector primary nozzle. The primary feed stock is for example carbonaceous fuel and the provided at least one supplementary fluid is for example at least one of air and water. The at least one supplementary fluid can be for example inert gas used for recirculation purging of the system in shutdown or transient situations.

In an exemplary embodiment according to the present disclosure means 129 are for activating and promoting a decomposition reaction of at least one feed stock or a chemical reaction between at least two feed stocks upstream of the nozzle 114 of the ejector 110 for achieving desired temperature and desired volume of the primary feedstock flow. The means 129 are for example an element with catalytic properties and sufficient surface area and suitable geometry for bringing the gas mixture to a thermodynamic equilibrium or sufficiently close to equilibrium. The means 129 can also be for example a device such as an ignition element providing a hot surface igniting an otherwise exothermic reaction. The means 129 are presented in an exemplary embodiment of FIG. 5, but they can be utilized also in other embodiments disclosed herein, in same or different locations as presented in FIG. 5.

Temperature of at least one of the feed stocks and supplementary fluids can be actively controlled by means 122, which are for example a heat exchanger utilizing secondary hot flows available in the system or from an outside heat source or an electrical heater, a gas temperature measurement device such as a thermocouple, means for controlling heat input by adjusting flow or temperature of a secondary heating flow or power of the electrical heater. In one embodiment the means 122 can perform active temperature controlling for example below reaction threshold temperature. This can be performed for example by keeping highest local temperature below the level. The means 122 performing active temperature controlling for example below reaction threshold temperature are for example a heat exchanger utilizing secondary hot flows available in the system or an electrical heater, gas temperature measurement device such as a thermocouple, means for controlling heat input by adjusting flow or temperature of a secondary heating flow or power of the electrical heater. The means 122 can also be accomplished by processor means utilizing information on reaction threshold temperature of known reactants at a known pressure range taking into account possible catalytic effects of materials which the fluid is in contact with. It is also possible in an exemplary embodiment according to the disclosure that an exothermic reaction is designed to take place between the primary feedstock fluid and the supplementary fluid downstream of the ejector 110.

In a further exemplary embodiment the recirculation arrangement can include means 124 for by-passing the nozzle 114 of the ejector 110 by a fraction of at least one feed stock to downstream of the ejector when amount of the feed stocks needed by the system is greater than amount required as a motive flow for inducing desired flow rate of recirculation. The means 124 are for example a by-pass pipe equipped with a control valve or a defined restriction equipped with a shut-off valve. The bypassing can be performed for example passively by means 124 for by-passing passively based on pressure level the nozzle 114 of the ejector 110 by the fraction of at least one feed stock. The means 124 for by-passing passively are for example an overflow or relief valve, which closes passively by means of a spring or pneumatic action when process pressure is below a set level, for example with known flow characteristics. The bypassing of the primary nozzle of the ejector by the fraction of at least one feed stock can be also performed actively controlled by fluid control means, which utilize measurement information in the bypass control.

Figure 6:
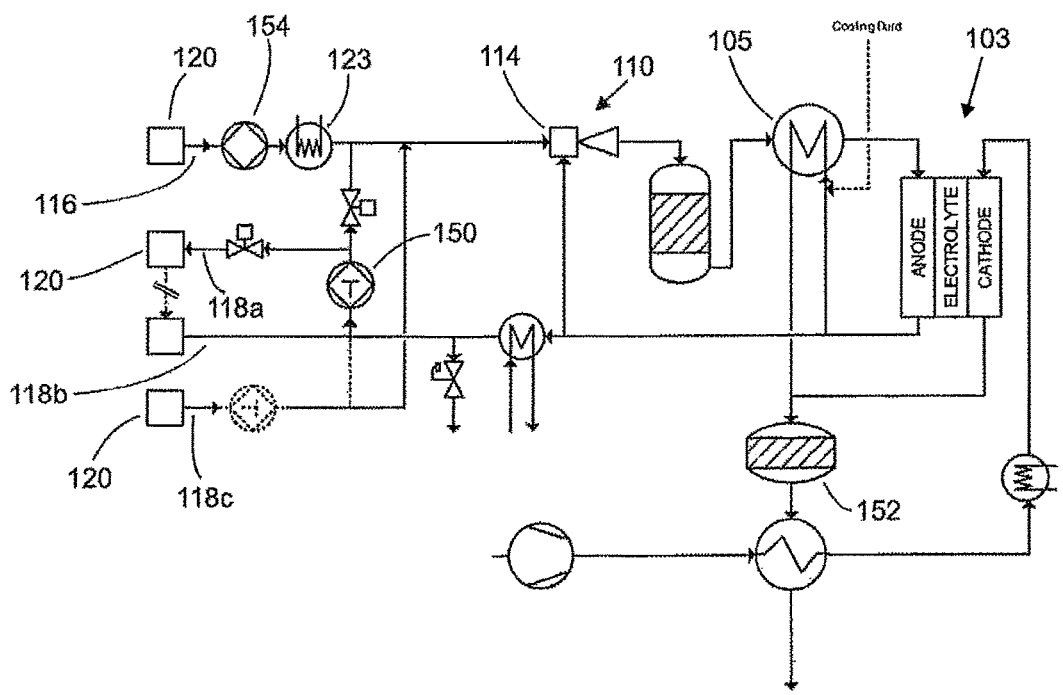
FIG. 6 presents third exemplary embodiment disclosed herein.

The recirculation arrangement of FIGS. 4, 5, 6 can include means 120 for regulating respective ratio of the fluids of the ejector 110 to maintain required motive flow and pressure at the nozzle 114 of the ejector in order to accomplish the desired recirculated flow rate. For example, a regulated respective ratio of primary feedstock fluid and at least one supplementary fluid can be provided but also for example a respective ratio of first supplementary fluid and second supplementary fluid can be regulated. The means 120 are for example a flow control and shut-off device such as a valve with known flow characteristics or a flow controller device with measurement and closed loop control feed-back arrangement. The arrangement can include temperature and pressure measurement means for the ejector primary flow, based on which accurate flow information of the feedstocks can be obtained based on ejector characteristics. The flow information can be utilized to replace flow measurement means in one of the feedstock lines or as a secondary information to calibrate or detect inaccuracy in feedstock flow information. Also, differences in thermal capacity of different feedstocks together with heating power information from the temperature control means can be utilized to generate flow information of primary feedstocks. Also information of the pressure oscillation of the primary nozzle flow, caused by e.g. compressors in the feedstock feeds can be utilized to obtain flow information of the feedstock feeds.

Figure 7:
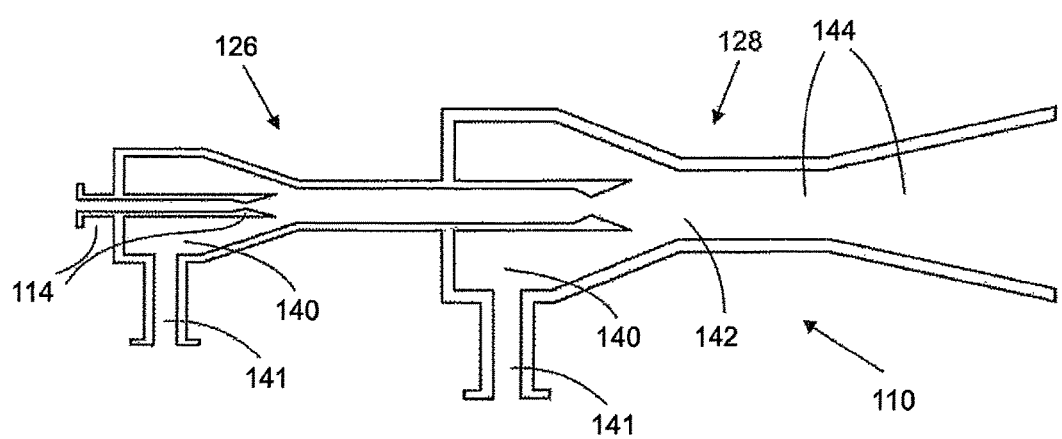
FIG. 7 presents an exemplary structure of a two-stage ejector.

In an exemplary embodiment according to the present disclosure the ejector 110 presented in FIG. 7 includes first stage 126 and second stage 128, each stage having a relatively high pressure primary inlet for the feed stocks, a relatively low pressure suction inlet for an entrained fluid and an intermediate pressure outlet, and outlet of the first stage being connected to the primary inlet of the second stage. At least one feed stock is used at the first stage 126 for entraining at least one other feed stock to form mixture to be used in the second stage 128 for inducing recirculation of anode 100 side gas.

FIG. 6 presents an exemplary embodiment of an implementation in a cell system intended for continuously or periodically being used for chemical synthesis by electrolysis, the cell system having means for aggregating product species. When the exemplary embodiment is operated in power generation mode, fuel is supplied as a primary feed stock fluid 116 while supplementary feed stock fluids 118a, 118b, 118c are pressurized air for partial oxidation of fuel in start-up sequence. Conditions at ejector 110 primary nozzle 114 can be maintained in heat-up, hot idle and low partial load operating modes by supplementing fuel by air or by recovered anode tail gas re-pressurized by means of a gas pump 150. In electrolysis mode, water as a primary feed stock (feed stock 3) is pumped as a liquid to a steam generator 154. Possible secondary feed stocks in electrolysis mode of operation may be, but are not limited to externally supplied carbon dioxide, hydrogen and nitrogen, or recovered anode tail gas. Supplementary feed stocks can be used for conditioning gas composition of the mixture supplied to the anode sides 100 of the cell stacks 103 for optimal electrolysis performance at desired reactant utilization rate. Co-electrolysis of carbon dioxide and water may be used for production of synthesis gas out of water and sequestered carbon dioxide. In case electrolysis is used as a means for periodic energy storage with an intention that electrolysis products will be used as fuel for power generation at another time, an external circuitry can be arranged for connecting product gas storage through means 116, 118 for supplying feed stocks to ejector 110 primary nozzle 114. The exemplary embodiment of FIG. 6 also presents a liquid pump 154 which pumps liquid to an evaporator 123.

Exemplary embodiments according to the present disclosure can use different kinds of ejector arrangements. There can be used parallel connected ejectors for example so that each group of cell stacks has an own ejector.

Although the invention has been presented in reference to the attached figures and specification, the invention is by no means limited to those as the invention is subject to fuel cell or electrolysis cell system and method variations within the scope allowed for by the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A recirculation arrangement for a high temperature fuel cell system or electrolysis cell system, each cell in the system having an anode, a cathode, and an electrolyte between the anode and the cathode, the recirculation arrangement comprising:

at least one ejector for recirculating a fraction of gas exhausted from the anode and for accomplishing a desired flow rate of the recirculated flow, the ejector having at least one nozzle;

means for providing at least one primary feedstock fluid to said nozzle of the ejector, which nozzle has a convergent-divergent flow channel through which the at least one primary feedstock fluid will expand from an initial higher pressure to a lower pressure;

means for providing at least one supplementary fluid to said nozzle of the ejector, the supplementary fluid constituting a majority of a total flow supplied to the nozzle at startup of the system;

means for regulating a respective ratio of at least part of the fluids of the ejector to maintain a desired motive flow and pressure at the nozzle of said ejector in order to accomplish the desired recirculated flow rate; and means for cutting off the supplementary fluid when a level of system loading is such that the primary feedstock fluid alone maintains the desired motive flow and pressure at an ejector inlet, wherein the at least one ejector comprises a supersonic ejector, wherein in the supersonic ejector, motive flow expands in a series of supersonic shocks assisting in mixture of the supplementary fluid with the at least one primary feedstock fluid, the at least one supplementary fluid is water, wherein an oxygen to-carbon ratio of a mixture of primary and supplementary fluids supplied to the nozzle of the ejector is above a carbon forming threshold when fuel cells are not loaded, and wherein the flow in said nozzle reaches speed of sound whenever at least one primary feedstock is supplied.

2. A recirculation arrangement in accordance with claim 1, wherein the recirculation arrangement comprises:
means for obtaining pressure information on the nozzle, wherein the means for providing at least one supplementary fluid to said nozzle of the ejector operates on the basis of said pressure information on the nozzle.

3. A recirculation arrangement in accordance with claim 2, wherein the recirculation arrangement comprises:
means for obtaining flow information on the basis of said pressure information on the nozzle.

4. A recirculation arrangement in accordance with claim 1, wherein the recirculation arrangement comprises:
means for actively controlling temperature of the at least one primary feedstock and the at least one supplementary fluid.

5. A recirculation arrangement in accordance with claim 4, wherein the recirculation arrangement comprises:
means for actively controlling temperature of the at least one primary feedstock and supplementary fluids below a reaction threshold temperature.

6. A recirculation arrangement in accordance with claim 1, wherein the recirculation arrangement comprises:
means for by-passing the nozzle of the ejector by a fraction of the at least one primary feedstock to downstream of the ejector when an amount of the at least one primary feedstock needed by the system is greater than an amount required as a motive flow for inducing desired flow rate of recirculation.

7. A recirculation arrangement in accordance with claim 6, wherein the recirculation arrangement comprises:
means for by-passing passively based on pressure level the nozzle of the ejector by the fraction of the at least one primary feedstock.

8. A recirculation arrangement in accordance with claim 1,
wherein the at least one primary feedstock is carbonaceous fuel and said at least one supplementary fluid is air and water.

9. A recirculation arrangement in accordance with claim 1, wherein the ejector comprises:
a first stage and a second stage, each stage having a relatively high pressure primary inlet for the at least one primary feedstock, a relatively low pressure suction inlet for an entrained fluid and an intermediate pressure outlet, and an outlet of the first stage being connected to the primary inlet of the second stage, and at least one feedstock being used at the first stage for entraining at least one other feed stock to form a mixture to be used in the second stage for inducing recirculation of anode side gas.

10. A recirculation arrangement in accordance with claim 1, wherein
said at least one ejector is configured to recirculate a fraction of gas exhausted from the anode.

11. A recirculation arrangement in accordance with claim 1, wherein the recirculation arrangement comprises:
means for recovering and re-pressurizing a fraction of anode side gas to be further used as said supplementary fluid in said ejector for inducing the recirculation of anode side gas.

12. A recirculation arrangement in accordance with claim 1, wherein the recirculation arrangement comprises:
means for activating and promoting a chemical reaction in at least one feed stock upstream of the nozzle of said ejector for achieving desired temperature and desired volume of a flow of the at least one primary feedstock.

13. A recirculation arrangement for a high temperature fuel cell system or electrolysis cell system, each cell in the system having an anode, a cathode, and an electrolyte between the anode and the cathode, the recirculation arrangement comprising:
at least one ejector for recirculating a fraction of gas exhausted from the anode and for accomplishing a desired flow rate of the recirculated flow, the ejector having at least one nozzle;
means for providing at least one primary feedstock fluid to said nozzle of the ejector, which nozzle has a convergent-divergent flow channel through which the at least one primary feedstock fluid will expand from an initial higher pressure to a lower pressure;
means for providing at least one supplementary fluid to said nozzle of the ejector, the supplementary fluid constituting a majority of a total flow supplied to the nozzle at startup of the system;
means for regulating a respective ratio of at least part of the fluids of the ejector to maintain a desired motive flow and pressure at the nozzle of said ejector in order to accomplish the desired recirculated flow rate; and
means for cutting off the supplementary fluid when a level of system loading is such that the primary feedstock fluid alone maintains the desired motive flow and pressure at an ejector inlet,
wherein the at least one ejector comprises a supersonic ejector, and
wherein in the supersonic ejector, motive flow expands in a series of supersonic shocks assisting in mixture of the supplementary fluid with the at least one primary feedstock fluid,
wherein an oxygen to-carbon ratio of a mixture of primary and supplementary fluids supplied to the nozzle of the ejector is above a carbon forming threshold when fuel cells are not loaded, and
wherein said at least one supplementary fluid is water and nitrogen used for recirculation purging of the system in shutdown or transient situations.

14. A recirculation method for a high temperature fuel cell system or electrolysis cell system, the method comprising:
recirculating a fraction of gas exhausted from at least one of an anode side and a cathode side;
accomplishing a desired flow rate of the recirculated flow by using an ejector via at least one primary feedstock fluid to a nozzle of the ejector, which nozzle has a convergent-divergent flow channel through which the at least one primary feedstock fluid is expanded from an initial higher pressure to a lower pressure;

providing at least one supplementary fluid to said nozzle of the ejector, the supplementary fluid constituting a majority of a total flow supplied to the nozzle at startup of the system;

regulating a respective ratio of the fluids of the ejector to maintain a desired motive flow and pressure at the nozzle of said ejector in order to accomplish said desired recirculated flow rate; and cutting off the supplementary fluid when a level of system loading is such that the primary feedstock fluid alone maintains a desired flow and pressure at ejector inlet, wherein the ejector is a supersonic ejector, and wherein in the supersonic ejector, motive flow expands in a series of supersonic shocks assisting in mixture of the supplementary fluid with the at least one primary feedstock fluid, and the at least one supplementary fluid is water, wherein an oxygen to-carbon ratio of a mixture of primary and supplementary fluids supplied to the nozzle of the ejector is above a carbon forming threshold when fuel cells are not loaded, and wherein the flow in said nozzle reaches speed of sound whenever at least one primary feedstock is supplied.

15. A recirculation method in accordance with claim 14, comprising:
obtaining pressure information on the nozzle;
providing at least one supplementary fluid to said nozzle of the ejector on the basis of the obtained pressure information on the nozzle.

16. A recirculation method in accordance with claim 14, comprising:
obtaining flow information on the basis of pressure information on the nozzle.

17. A recirculation method in accordance with claim 14, comprising:
actively controlling a temperature of at least one of the at least one primary feedstock and the at least one supplementary fluid.

18. A recirculation method in accordance with claim 17, comprising:
actively controlling a temperature of at least one of the at least one primary feedstock and the at least one supplementary fluid below a reaction threshold temperature.

19. A recirculation method in accordance with claim 14, comprising:
bypassing the nozzle of the ejector by a fraction of the at least one primary feed stock to downstream of the ejector when an amount of the at least one feedstock needed by the system is greater than an amount required as a motive flow for inducing desired flow rate of recirculation.

20. A recirculation method in accordance with claim 19, comprising:
bypassing the nozzle of the ejector passively based on a pressure level of the nozzle by the fraction of the at least one primary feedstock.

21. A recirculation method in accordance with claim 14, wherein the primary feed stock is carbonaceous fuel and said at least one supplementary fluid is air and water.

22. A recirculation method in accordance with claim 14, comprising:

arranging the ejector with a first stage and second stage, a relatively high pressure primary inlet being arranged for the feed stocks, a relatively low pressure suction inlet being arranged for an entrained fluid and an intermediate pressure outlet being arranged for the outlet, and an outlet of the first stage is connected to the primary inlet of the second stage, and at least one feed stock is used at the first stage for entraining at least one other feed stock to form mixture to be used in the second stage for inducing recirculation of anode side gas.

23. A recirculation method in accordance with claim 14, comprising:
recirculating a fraction of gas exhausted from the anode.

24. A recirculation method in accordance with claim 14, wherein a recovered and re-pressurized fraction of anode side gas is used as said supplementary fluid in said ejector for inducing the recirculation of anode side gas.

25. A recirculation method in accordance with claim 14, comprising:
activating and promoting a chemical reaction in the at least one primary feed stock upstream of the nozzle of said ejector for achieving a desired temperature and desired volume of a flow of the at least one primary feedstock.

26. A recirculation method for a high temperature fuel cell system or electrolysis cell system, the method comprising:
recirculating a fraction of gas exhausted from at least one of an anode side and a cathode side;
accomplishing a desired flow rate of the recirculated flow by using an ejector via at least one primary feedstock fluid to a nozzle of the ejector, which nozzle has a convergent-divergent flow channel through which the at least one primary feedstock fluid is expanded from an initial higher pressure to a lower pressure;
providing at least one supplementary fluid to said nozzle of the ejector, the supplementary fluid constituting a majority of a total flow supplied to the nozzle at startup of the system;
regulating a respective ratio of the fluids of the ejector to maintain a desired motive flow and pressure at the nozzle of said ejector in order to accomplish said desired recirculated flow rate; and
cutting off the supplementary fluid when a level of system loading is such that the primary feedstock fluid alone maintains a desired flow and pressure at ejector inlet,
wherein the ejector is a supersonic ejector, and
wherein in the supersonic ejector, motive flow expands in a series of supersonic shocks assisting in mixture of the supplementary fluid with the at least one primary feedstock fluid, and
wherein an oxygen to-carbon ratio of a mixture of the at least one primary feedstock fluid alone is above a carbon forming threshold when fuel cells are not loaded, and
wherein said at least one supplementary fluid is water and nitrogen which is used for recirculation purging of the system in shutdown or transient situations.

* * * * *